(12) United States Patent
Chan

(10) Patent No.: US 12,717,978 B2
(45) Date of Patent: Aug. 25, 2026

(54) SYSTEMS, METHODS AND DEVICES FOR SENSOR-BASED COMPUTER LOCKING

(71) Applicant: Chunkin Chan, Hongkong (CN)

(72) Inventor: Chunkin Chan, Hongkong (CN)

( * ) Notice: Subject to any disclaimer, the term of this patent is extended or adjusted under 35 U.S.C. 154(b) by 191 days.

(21) Appl. No.: 18/672,032

(22) Filed: May 23, 2024

(65) Prior Publication Data

US 2025/0363253 A1 Nov. 27, 2025

(51) Int. Cl.

| | |
|---|---|
| ***G06F 21/88*** | (2013.01) |
| ***G01S 13/00*** | (2006.01) |
| ***G06V 40/16*** | (2022.01) |

(52) U.S. Cl.
CPC .............. *G06F 21/88* (2013.01); *G01S 13/00* (2013.01); *G06V 40/16* (2022.01)

(58) Field of Classification Search
CPC ......... G06F 21/88; G06V 40/16; G01S 13/00; G01S 13/86; G06Q 20/4016
See application file for complete search history.

(56) References Cited

U.S. PATENT DOCUMENTS

| | | | | |
|---|---|---|---|---|
| 6,282,655 | B1 * | 8/2001 | Given | G06F 21/57 726/19 |
| 9,892,271 | B2 * | 2/2018 | Agrawal | H04L 63/0861 |
| 11,576,243 | B2 * | 2/2023 | Coleman | G01S 7/497 |
| 11,663,315 | B2 * | 5/2023 | Milito | G06F 21/44 726/4 |
| 11,994,405 | B2 * | 5/2024 | Filip | H04N 23/698 |
| 12,153,158 | B2 * | 11/2024 | Statnikov | G01S 13/52 |
| 2021/0342435 | A1 * | 11/2021 | Milito | G06F 21/35 |
| 2021/0365124 | A1 * | 11/2021 | Gillian | G01S 7/4004 |

* cited by examiner

*Primary Examiner* — Hosuk Song
(74) *Attorney, Agent, or Firm* — Bayramoglu Law Offices LLC

(57) ABSTRACT

Computer locking systems, methods and devices are disclosed. A controller (102) is configured to monitor, based on signals from a sensor (104), presence of a user in front of the sensor (104). In addition, the controller (102) determines, based on the signals from the sensor (104), that a user is not present in front of the sensor (104) and, in response to determining that the user is not present in front of the sensor (104) based on the sensor signals, transmits a keystroke code to a computer (106). Here, the keystroke code is configured to cause the computer (106) to implement a computer lock.

18 Claims, 4 Drawing Sheets

SYSTEMS, METHODS AND DEVICES FOR SENSOR-BASED COMPUTER LOCKING

TECHNICAL FIELD

The present disclosure relates to computer security and, more particularly, to computer locking systems, methods and devices.

BACKGROUND

The use of computers is ubiquitous in modern society and information stored on computers ranges from all types of private data, including medical records, financial information and other confidential data. Thus, security of a computer and maintaining confidentiality of information stored is of utmost concern. One vulnerability of computer security is that a user may walk away from a computer and the computer may not screen lock in time to prevent another person from accessing the computer. Currently, there does not seem to be an adequate means of addressing this problem.

SUMMARY

In accordance with embodiments of the present application, a computer lock device employs a sensor to detect whether the user is present and implements a computer lock when the user moves away from the sensor. A computer lock is a mechanism in which computer access is prevented and requires a passcode to enable access to the computer. Here, the passcode can be, for example, a password, a code sent to a mobile phone or provided on the fly by a mobile phone security application, a face that is recognized by the computer, a fingerprint that is recognized by a computer, or some other biometric information. For example, the computer lock can be implemented as a screen lock. Moreover, the computer lock device can implement a computer lock by sending a keystroke code to the computer. For example, in accordance with a preferred exemplary embodiment, the keystroke code can be a standard code defined in the computer's operating system to implement a screen lock. Thus, no additional software or application is required to be installed on the computer to implement the computer lock in accordance with the principles of preferred embodiments described herein.

One exemplary embodiment is directed to a computer locking system that includes a sensor and a controller. The controller is configured to monitor, based on signals from the sensor, presence of a user in front of the sensor. In addition, the controller determines, based on the signals from the sensor, that a user is not present in front of the sensor and, in response to determining that the user is not present in front of the sensor based on the sensor signals, transmits a keystroke code to a computer. Here, the keystroke code is configured to cause the computer to implement a computer lock.

According to another exemplary aspect, the system further includes the computer, which interprets the keystroke code as being keystrokes. Here, the computer lock is a screen lock and the computer implements the screen lock in response to receiving the keystroke code from the controller. In accordance with one exemplary feature, the keystroke code denotes a simultaneous selection of multiple keys that is defined as a screen lock code by an operating system of the computer.

In another exemplary aspect, the system includes a keyboard, where the sensor and the controller are integrated into the keyboard which is coupled to the computer and where the keystroke code is transmitted by the controller to the computer via an interface with which the keyboard is coupled to the computer.

According to another exemplary aspect, the system includes a display device coupled to the computer and the sensor is mounted on the display device.

In accordance with another exemplary aspect, the controller is configured to monitor a distance of the user from the sensor and to determine that the user is not present within a predefined distance of the sensor. According to one exemplary feature, the controller is configured to determine that the user is not present within the predefined distance of the sensor for a time interval selected by the user.

In another exemplary aspect, the controller is configured to recognize a face of the user. Further, according to one feature, the controller is configured to determine that the user is present in front of the sensor based on additional signals output by the sensor and, in response to determining that the user is present in front of the sensor, the controller is configured to transmit an additional keystroke code to the computer that is a user's password for unlocking the computer.

According to one exemplary feature, the sensor is a radar sensor.

Another exemplary embodiment is directed to a computer locking method. In accordance with the method, a presence of a user in front of a sensor is monitored. The method includes determining, based on signals from the sensor, that a user is not present in front of the sensor, and, in response to determining that the user is not present in front of the sensor based on the sensor signals, transmitting a keystroke code to a computer. Here, the keystroke code is configured to cause the computer to implement a computer lock.

In accordance with one exemplary aspect, the computer lock is a screen lock. Further, according to an exemplary feature, the keystroke code denotes a simultaneous selection of multiple keys that is defined as a screen lock code by an operating system of the computer.

According to another exemplary aspect, the sensor is integrated into a keyboard coupled to the computer and the keystroke code is transmitted by a processor integrated into keyboard to the computer via an interface with which the keyboard is coupled to the computer.

In one exemplary aspect, the sensor is mounted on a display device coupled to the computer.

Further, in another exemplary aspect, the monitoring includes monitoring a distance of the user from the sensor and the determining includes determining that the user is not present within a predefined distance of the sensor. Further, according to another exemplary feature, the determining that the user is not present within the predefined distance of the sensor includes determining that the user is not present within the predefined distance of the sensor for a time interval selected by the user.

Further, according to another exemplary aspect, the monitoring comprises recognizing a face of the user. In accordance with one exemplary feature, the method includes determining that the user is present in front of the sensor based on additional signals output by the sensor and, in response to determining that the user is present in front of the sensor, transmitting an additional keystroke code to the computer that is a user's password for unlocking the computer.

According to another exemplary aspect of the method, the sensor is a radar sensor.

BRIEF DESCRIPTION OF THE DRAWINGS

In order to more clearly illustrate the embodiments of the present disclosure, a brief description of the drawings is given below. The following drawings are only illustrative of some of the embodiments of the present disclosure and for a person of ordinary skill in the art, other drawings or embodiments may be obtained from these drawings without inventive effort.

DETAILED DESCRIPTION

Figure 1:
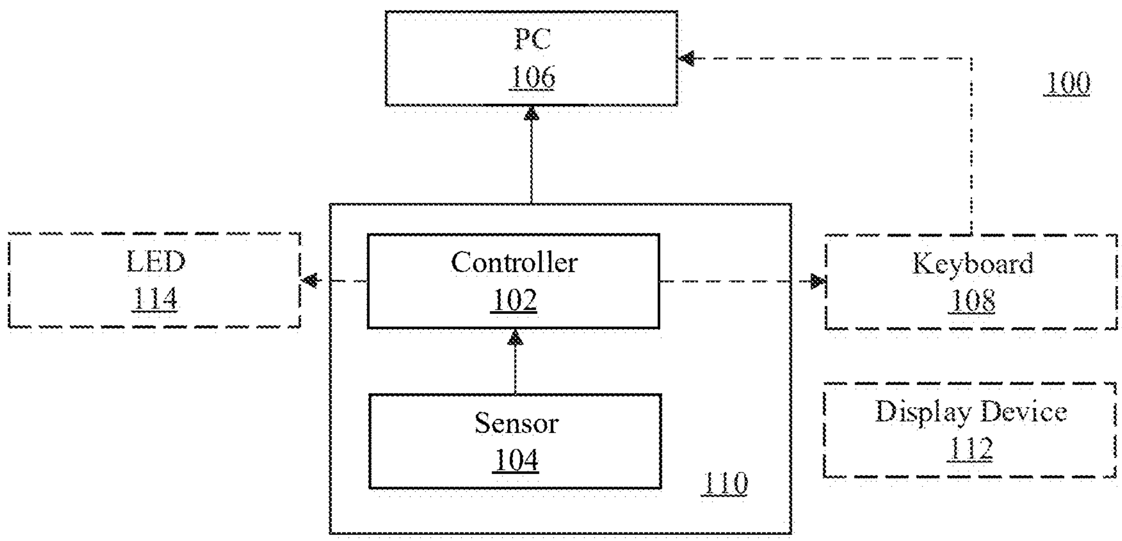
FIG. 1 is a high-level block diagram of a computer locking system in accordance with an exemplary embodiment.

The technical solutions of the present disclosure will be clearly and completely described below with reference to the drawings wherein like reference numerals are used to refer to like elements throughout. The embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

Figure 2:
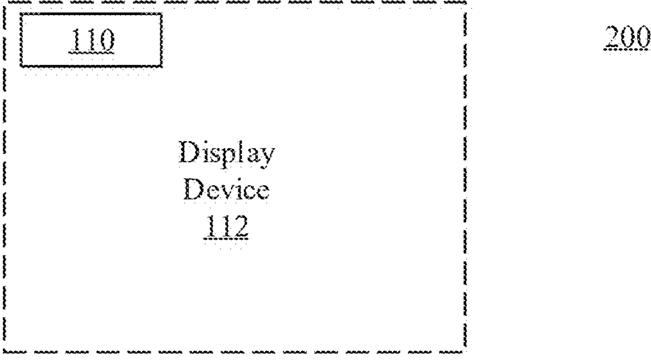
FIG. 2 is a high-level block diagram of a computer locking device mounted on a display in accordance with an exemplary embodiment.
Figure 3:
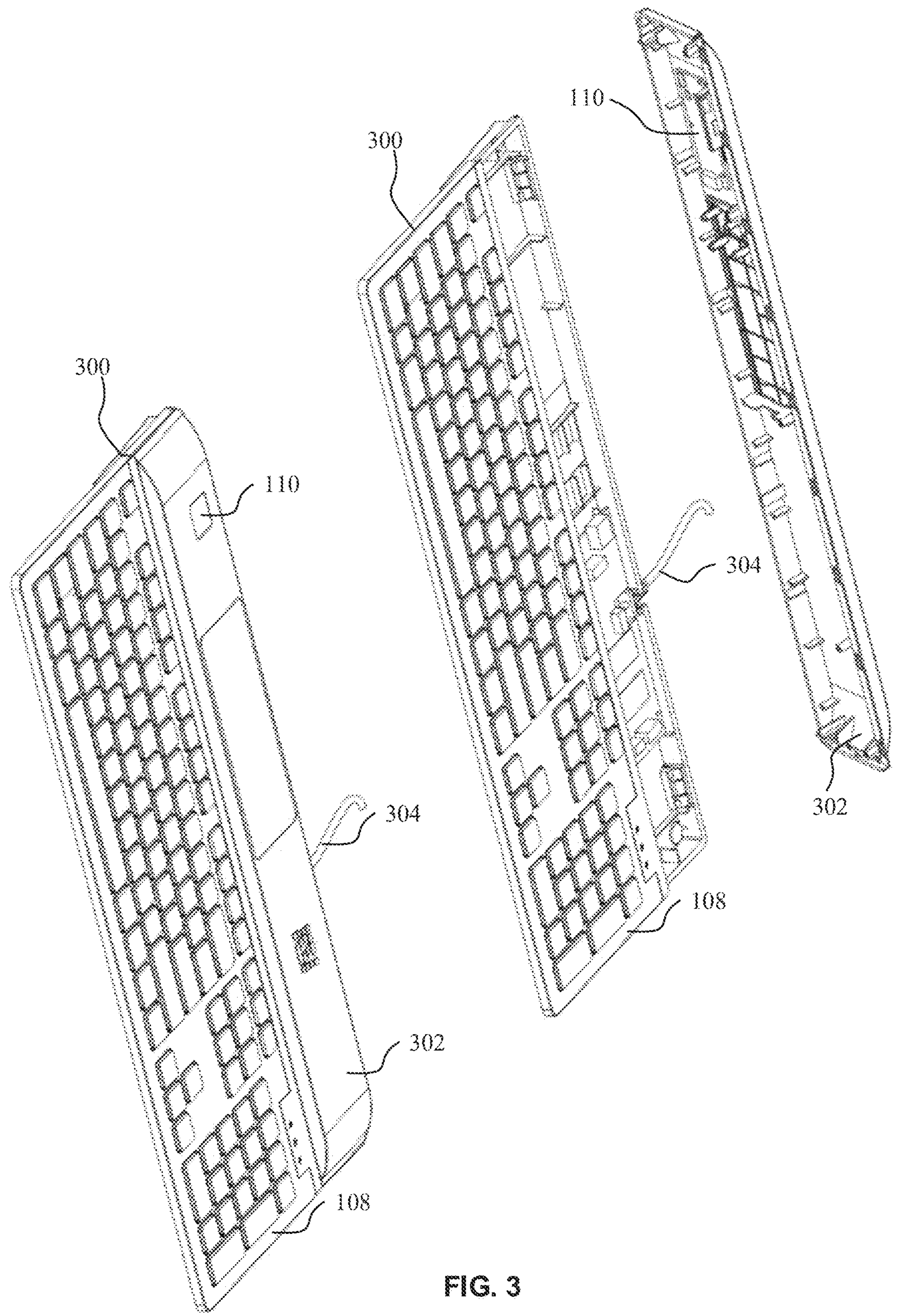
FIG. 3 is a diagram of a computer locking device implemented in a keyboard in accordance with an exemplary embodiment.

With reference now to FIG. 1, a computer locking system 100 in accordance with an exemplary embodiment is illustratively depicted. The system 100 includes a computer locking device 110 comprising a controller 102 and a sensor 104. In accordance with a preferred embodiment, the controller 102 can be a microcontroller unit (MCU). However, it should be understood that the controller 102 can be implemented by any appropriate processor and can employ Random Access Memory (RAM) and/or Read Only Memory (ROM), and/or can include storage devices, such as, for example, solid-state drives (SSDs), on which computer program instructions can be stored and implemented by the controller 102 to perform the methods disclosed herein. Further, the sensor 104 is a presence sensor and can be implemented with one or more various sensors including, for example, a thermal sensor, an ultrasonic sensor, an infrared sensor, a micro-movement detector, a camera, an AI-assisted sensor, among others. Preferably, the sensor is a radar sensor. The system 100 further includes a personal computer (PC) 106, a keyboard 108, a display device 112 and a light-emitting device (LED) 114. In accordance with one exemplary embodiment, the LED device 114 can include two LEDs, an upper LED and a lower LED. The upper LED indicates the sensor's detection status under the control of the controller 102, where the upper LED illuminates in green when a user is detected and in red otherwise. If the user is inactive for a specified period of time, the controller can control the upper LED so that the red color changes from a continuous red to a flashing red. The lower LED can emit five different colors under the control of the controller 102, where each color represents a specific area within the detection range of the sensor 104. With reference to FIG. 2, in accordance with one exemplary implementation 200, as illustrated in FIG. 2, the computer locking device 110 is mounted on a display device 112, which can be a computer monitor, and can communicate with the PC 106 via wired connection, such as, for example, a universal serial bus (USB) connection, or a wireless connection, such as, for example, via radio-frequency (RF) signals, Bluetooth signals, among others. In accordance with a preferred implementation 300, shown in FIG. 3, the computer locking device 110 can be integrated into the keyboard 108. Here, the locking device 110 can be integrated into a slot of a cover 302 and coupled to the circuit board of the keyboard 108 to enable the locking device 110 to transmit signals to the PC 106 in the same manner the keyboard transmits keystroke signals to the PC 106. In other words, in accordance with a preferred aspect, the controller 102 communicates with the PC 106 through the same interface, whether wired or wireless, with which keystroke signals are transmitted to the PC 106 when keys are pushed and actual keystrokes occur. For example, the locking device 110 can transmit signals to the PC 106 via wire 304, which can be connected to the PC 106 via a USB port on the PC. Preferably, the signals conform to the USB human interface device (HID) class (USB HID class). Alternatively, if the keyboard 108 is a wireless keyboard, the locking device 110 can communicate with the PC 106 wirelessly via, for example, RF signals, and/or Bluetooth signals, among others. The functions of the various elements of the system 100 are described in detail herein below with respect to the method 400 below.

Figure 4:
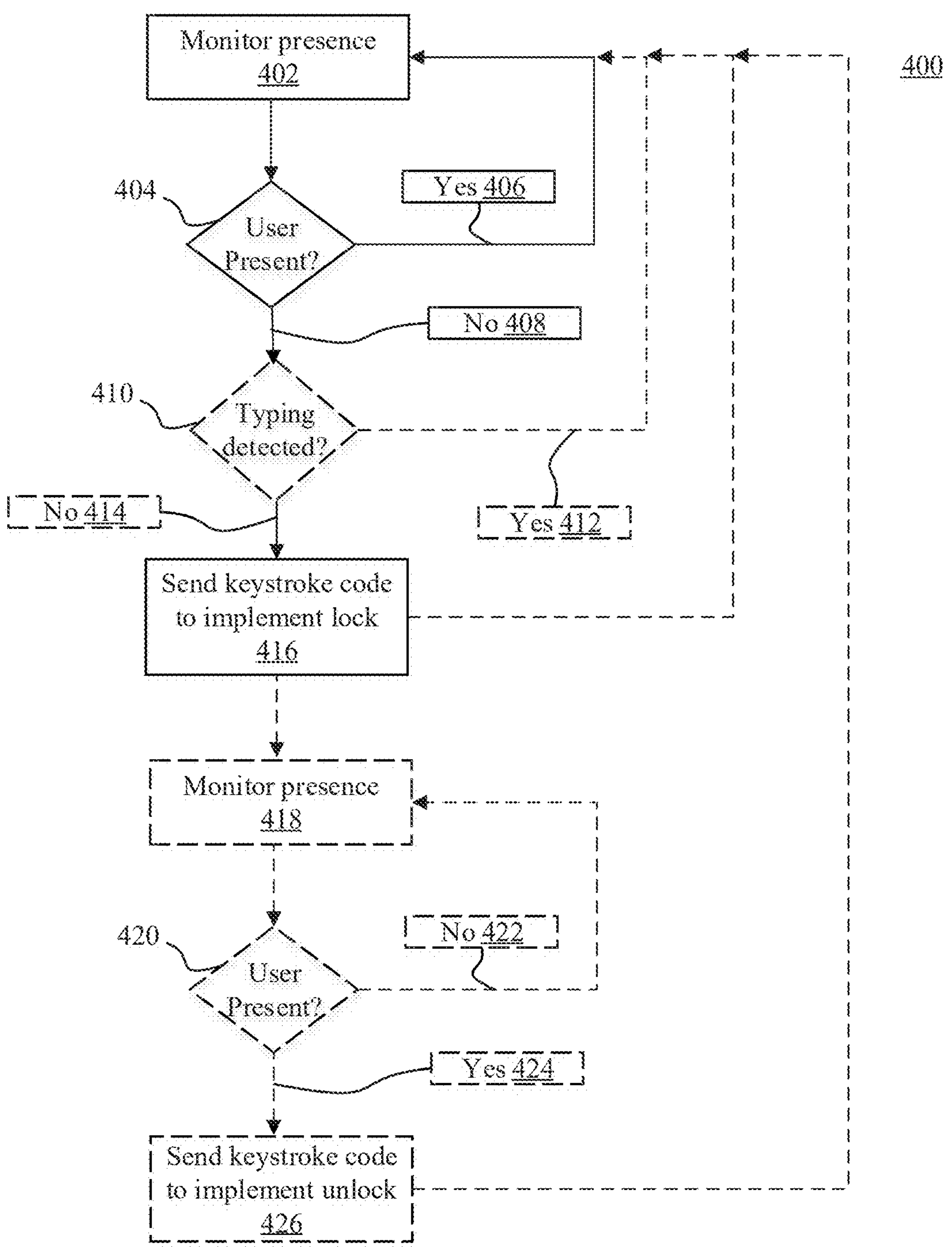
FIG. 4 is a high-level flow diagram of a computer locking method in accordance with an exemplary embodiment.

Referring now to FIG. 4, with continuing reference to FIG. 1, a computer locking method 400 is illustratively depicted. At step 402, the computer locking device 110 monitors the presence of the user using the sensor 104. For example, in accordance with a preferred embodiment, the sensor 104 is a radar sensor, which is advantageous due to its ability to detect human presence through certain obstacles, such as clothes or furniture. A radar sensor is particularly useful in scenarios where line-of-sight detection is challenging or not feasible. Preferably, by gathering distance, speed, angle to target and position of the object to be detected, the controller 102 can determine an accurate assessment of human presence.

To determine a distance to the user, the sensor 104 can utilize electromagnetic wave measurement to accurately evaluate the distance between the sensor and the user. This technique enables precise and reliable distance calculations, ensuring optimal performance in determining user presence and initiating the lock mechanism, as discussed herein below. In accordance with one exemplary aspect, the sensor 104 emits a low-power 60 GHz electromagnetic wave, towards the surrounding area. The emitted wave travels towards the object of interest, in this case the user, and, upon reaching the object, a portion of the wave is reflected back towards the sensor 104. The sensor 104 detects the reflected wave, and the controller 102 measures the time it takes for the wave to travel from the sensor to the user and back to obtain the round-trip time. Using the known speed of electromagnetic waves in the given medium (e.g., speed of light), the controller 102 converts the round-trip time into a distance measurement, where the calculated distance represents the object's/user's distance from the sensor.

In accordance with one exemplary aspect, the controller 102 can utilize the Doppler shift in frequency to accurately derive the speed of objects, which in this case is the user. The doppler effect refers to the change in frequency observed when there is relative motion between a source emitting waves and an observer. The sensor emits a low-power 60 GHz electromagnetic wave towards the object whose speed is to be measured. When the transmitted waves encounter the object, in this case the user, a portion of the waves is reflected back towards the sensor. If the object is moving towards or away from the sensor, the received waves will undergo a change in frequency due to the Doppler effect. When an object is moving towards the sensor, the frequency of the reflected waves will be higher (shifted towards the blue end of the spectrum). Conversely, if the object is moving away from the sensor, the frequency will be lower (shifted towards the red end of the spectrum). Based on signals from the sensor 104, the controller 102 analyzes the received waves and measures the frequency shift. By comparing the transmitted frequency with the received frequency, the controller 102 can determine the magnitude and direction of the Doppler shift. Based on the magnitude of the frequency shift, the controller 102 can calculate the speed of the object. The Doppler shift is directly proportional to the relative velocity between the object and the sensor 104. Using known calibration curves or mathematical algorithms, the controller 102 can convert the frequency shift into a corresponding speed value. Further, by continuously analyzing the Doppler shift in real-time, the controller can obtain accurate, updated speed measurements of moving objects.

Further, to derive the angle to the object/user, the controller 102, in accordance with an exemplary aspect, can utilize the phase difference between the signals received at different antennas of the sensor 104 to implement a phase-based angle estimation. In accordance with one exemplary feature, the sensor 104 includes multiple antennas arranged in a specific configuration. The number and arrangement of antennas depend on the desired angle resolution and accuracy. When the sensor 104 receives signals from a target, in this case the user, each antenna detects the signal with a slight phase shift due to the target's position relative to the antennas. The controller 102 measures the phase difference between the signals received at each antenna. This phase difference is a result of the target's angle of arrival and the distance between the antennas. Based on the phase difference measurements, the controller 102 employs mathematical algorithms or signal processing techniques to calculate the angle of arrival. These calculations take into account the antenna configuration and calibration data to derive the precise angle to the target/user. Thus, the controller 102 derives an accurate estimation of the angle to the target based on the phase difference information. This estimation allows for precise localization and tracking of the target/user in various applications.

In addition, in accordance with another exemplary aspect, the controller 102 and the sensor 104 can utilize Frequency Modulated Continuous Wave (FMCW) technology to derive the position of an object/user with high accuracy. FMCW is a radar-based technique that allows for precise distance and position measurements by analyzing the frequency shift of transmitted and received signals. For example, in accordance with one exemplary feature, the sensor 104 can emit a continuous wave signal that is modulated in frequency. The frequency of the transmitted signal gradually increases or decreases over time, creating a linear frequency ramp. When the transmitted signal encounters an object, in this case the user, in its path, a portion of the signal is reflected back towards the sensor 104. The sensor 104, in turn, receives the reflected signal, which has undergone a frequency shift. The amount of frequency shift is proportional to the distance between the sensor and the object. Closer objects cause a larger frequency shift, while objects farther away cause a smaller shift. The received signal is combined with the original transmitted signal, resulting in a beat frequency signal. This beat frequency represents the difference between the transmitted and received frequencies, and its magnitude corresponds to the distance between the sensor and the object. By analyzing the beat frequency based on these features, the controller 102 can accurately determine the distance to the object. This is achieved by the controller 102 comparing the beat frequency to a known calibration curve or using mathematical algorithms to extract the distance information. By performing multiple distance measurements from different angles or using an array of sensors 104, the controller 102 can derive the position of the object in three-dimensional space. Triangulation or other localization algorithms may be employed to accurately calculate the object's/user's position based on the distance measurements.

However, it should be understood that other presence detection devices and/or methods can be employed to detect the presence of a user at step 402. As noted above, the presence can be based on, for example, a thermal sensor, an ultrasonic sensor, an infrared sensor a micro-movement detector, a camera, an AI-assisted sensor, among others. For example, the device 110 can monitor the presence of a user by employing a camera as the sensor 104 and the controller 102 can apply a facial recognition method based on the camera signals to determine whether a specific user is present in front of the sensor.

Figure 5:
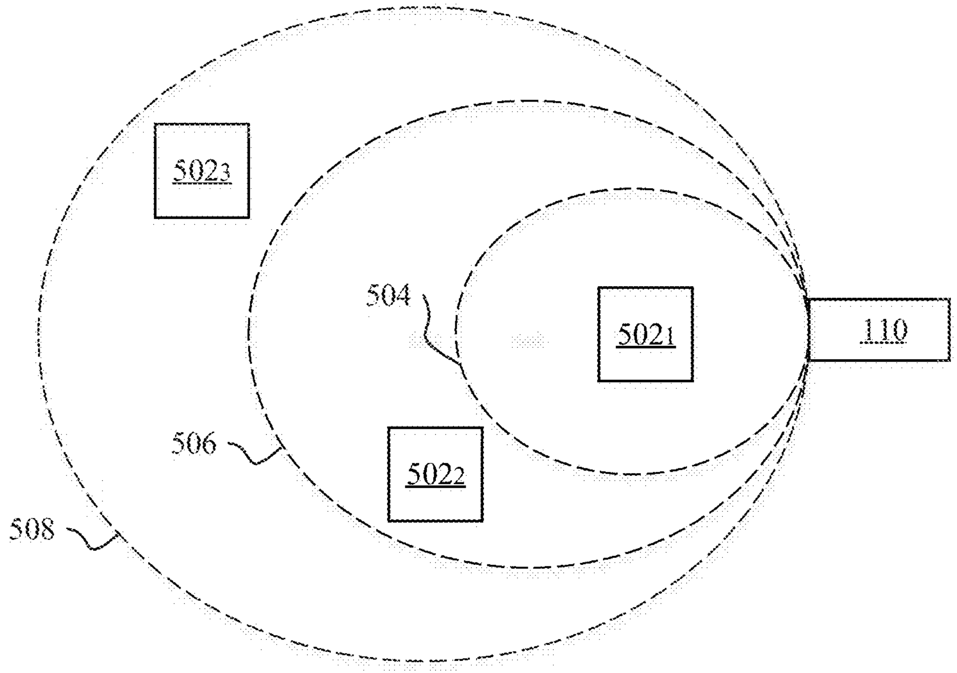
FIG. 5 is a diagram illustrating variable presence detection settings in accordance with an exemplary embodiment.

At step 404, the controller 102 determined whether a user is present in front of the sensor 104. For example, the controller 102 can determine whether a user is within a predefined distance range or area range from the sensor 104. For example, the controller 102 can determine the position/distance of the user as discussed above with respect to step 402 and, if the user is outside of a distance range or area range of the sensor 104, then the controller 102 determines that the user is not present in front of the sensor at step 408 and the method can proceed to step 416, or optionally step 410, as discussed herein below. In addition, if the user is within a distance range or area range of the sensor 104, then the controller 102 determines that the user is present in front of the sensor at step 406 and the method can proceed to step 402 and repeat, as indicated in FIG. 4. It should be understood that the presence detection can be based on a time interval as well. For example, the controller 102 can determine the position/distance of the user as discussed above with respect to step 402 and, if the user is outside of a distance range or area range of the sensor 104 for a predefined time interval, e.g., five seconds, then the controller 102 determines that the user is not present in front of the sensor at step 408 and the method can proceed to step 416, or optionally step 410, as discussed herein below. In addition, if the user is within a distance range or area range of the sensor 104 at least once within a certain time interval, e.g., at least once within five seconds, then the controller 102 determines that the user is present in front of the sensor at step 406 and the method can proceed to step 402 and repeat, as indicated in FIG. 4. Here, the distance and time interval can be set by the user. For example, the distance and time interval can be selected by the user through a user-interface of a mobile phone application, where the mobile phone transmits signals the computer locking device 110 through a wireless or wired interface. For example, the mobile phone can wirelessly connect to the computer locking device 110 directly via a wireless connection, e.g., a Bluetooth connection, or can wirelessly connect to the computer locking device 110 indirectly via a wired or wireless interface of the keyboard 108, which can for example, be a Bluetooth interface or a wired USB interface. For example, as illustrated in FIG. 5, the user can set the distance range or area range to be one of a plurality of distances from the sensor 104, denoted by ranges 504, 506 and 508, where range 508 is larger than range 506 and range 506 is large than range 504. Here, if a range 508 is set by the user, the controller 102 determines, at step 404, that a user $\mathbf{502}_1$ is present, a user $\mathbf{502}_2$ is present or a user $\mathbf{502}_3$ is present. Alternatively, if a range 506 is set by the user, the controller 102 determines, at step 404, that a user $\mathbf{502}_1$ is present or a user $\mathbf{502}_2$ is present, and that a user $\mathbf{502}_3$ is not present. Similarly, if a range 504 is set by the user, the controller 102 determines, at step 404, that a user $\mathbf{502}_1$ is present and a user $\mathbf{502}_2$ or a user $\mathbf{502}_3$ is not present. It should also be understood that the controller 102 can be configured to base the presence decision of step 404 on a particular user. For example, the controller 102 can apply a face recognition presence to determine whether a particular user is within a certain range of the sensor 104, where the device 110 can be trained to recognize the user with images taken of the user with, for example, a camera of the mobile phone, or with the sensor 104, if the sensor 104 is or includes a camera. Thus, for example, if the user-selected range was 506 and the device 110 was trained to recognize the user $\mathbf{502}_3$, and a time interval was set for 5 seconds and the user $\mathbf{502}_3$ was in the position illustrated in FIG. 5 for more than 5 seconds, then the controller 102 determines, at step 404, that the user is not present, despite the presence of users $\mathbf{502}_1$ and $\mathbf{502}_2$ within the range 506. Similarly, if the user-selected range was 506 and the device 110 was trained to recognize the user $\mathbf{502}_2$, then the controller 102 determines, at step 404, that the user is present. In this case, the time interval need not be considered if the user $\mathbf{502}_2$ is present within the selected range.

At optional step 410, the controller 102 can determine whether typing on the keyboard 108 is detected. For this step, if the system for some reason is not functioning correctly and determines that a user is not present, this step can ensure that the computer is not locked. For example, if the controller 102 determines that a user is typing on the keyboard 108, then the method can proceed to step 402 and repeat, as indicated in FIG. 4. Otherwise, if the controller 102 determines that a user is not typing on the keyboard 108 within a predefined time threshold, then the method can proceed to step 416. In addition, in alternative embodiments, the step 410 can be performed before step 402 so that it triggers the start of the monitoring in response to the controller 102 determining that there has not been typing on the keyboard 108 for a predefined time threshold. The predefined time threshold can be set by a user in the same way the user sets the predefined time interval discussed above. Alternatively, the predefined time threshold can be factory set for the device 110.

At step 416, the controller 102 transmit a keystroke code to implement a computer lock. As noted above, the controller 102 can transmit the keystroke code to the PC via USB HID interface or wirelessly via, for example, via RF signals, and/or Bluetooth signals, among others, as indicated above. Here, the keystroke code and be sent as signals interpreted by the PC as being keystrokes. In particular, in accordance with a preferred embodiment, the keystroke code can be the standard PC operating system (OS) screen lock key code combination. For example, for the Windows operating system the key code combination corresponds to the windows key and the "L" key. Here, in accordance with a preferred embodiment, the controller 102 transmits the keystroke code as the windows key and the "L" key of the keyboard 108 being selected together simultaneously to implement the screen lock. Alternatively, for an Apple Mac OS, the controller 102 transmits the keystroke code as the "control" key, the "command" key and the "Q" key of the keyboard 108 being selected together simultaneously to implement the screen lock. A significant advantage of this configuration is that the standard keyboard driver built in to the OS platform is used to implement the screen lock. For example, the standard driver can be a USB HID driver. No additional software or drivers need to be installed on the PC to implement the method 400, thereby ensuring security of the PC and assuring the user/owner of the PC that the PC is protected from malware. After the computer lock is implemented, then the method can be initiated again by the user inserting his or her passcode to unlock the screen. Then the method proceeds to step 402 and repeats. Alternatively, the method 400 can proceed to optional steps 418-426.

At optional step 418, the controller 102 can monitor the presence of the user in the same way as step 402.

At optional step 420, the controller 102 determines whether the user is present. If the controller 102 determines that the user is not present, at step 422, in the same way as steps 404 and/or 408, then the method proceeds to step 418, and is repeated. If the controller 102 determines at step 424 that the user is present in the same way as steps 404 and/or 406, then the method can proceed to optional step 426. Here, presence of the user effectively corresponds to the user returning to the selected range of the sensor 104, such as range 504, 506 or 508.

At step 426, the controller 102 can transmit a keystroke code to unlock the computer. For example, in accordance with an exemplary embodiment, the controller 102 can be trained to recognize the face of the user, as discussed above, and if the controller 102 determines that the user is present in front of the sensor 104 based on facial recognition, then the controller 102 transmits the keystroke code of the user's password to unlock the screen. The controller 102 can transmit this keystroke code to the PC 106 in the same way that controller 102 transmits the computer lock keystroke code to the PC at step 416. Thereafter, the method can proceed to step 402 and be repeated.

The above-mentioned embodiments of the present disclosure are only examples for describing the present disclosure more clearly, rather than limiting an implementation mode of the present disclosure. For those of ordinary skill in the art, other variations or changes in different forms can be made on the basis of the above description. For example, in accordance with alternative embodiments, in lieu of a radar sensor, a thermal sensor, an ultrasonic sensor, an infrared sensor, a micro-movement detector, a camera, or an AI-assisted sensor, among others, can be employed. It is impossible to list all implementation systems here. The obvious variations or changes derived from the technical solutions of the present disclosure still fall within the scope of protection of the present disclosure.

What is claimed is:

1. A computer locking system comprising:

a sensor; and a controller, wherein the controller is configured to monitor, based on signals from the sensor, presence of a user in front of the sensor, to determine, based on the signals from the sensor, that a user is not present in front of the sensor and, in response to determining that the user is not present in front of the sensor based on the sensor signals, to transmit a keystroke code to a computer, wherein the keystroke code is configured to cause the computer to implement a computer lock, wherein the keystroke code denotes a simultaneous selection of multiple keys that is defined as a screen lock code by an operating system of the computer.

2. The system of claim 1, further comprising the computer, wherein the computer interprets the keystroke code as being keystrokes, the computer lock is a screen lock and wherein the computer implements the screen lock in response to receiving the keystroke code from the controller.

3. The system of claim 1, further comprising a keyboard, wherein the sensor and the controller are integrated into the keyboard which is coupled to the computer and wherein the keystroke code is transmitted by the controller to the computer via an interface with which the keyboard is coupled to the computer.

4. The system of claim 1, further comprising a display device coupled to the computer, wherein the sensor is mounted on the display device.

5. The system of claim 1, wherein the controller is configured to monitor a distance of the user from the sensor and to determine that the user is not present within a predefined distance of the sensor.

6. The system of claim 5, wherein the controller is configured to determine that the user is not present within the predefined distance of the sensor for a time interval selected by the user.

7. The system of claim 1, wherein the controller is configured to recognize a face of the user.

8. A computer locking system comprising:

a sensor; and a controller, wherein the controller is configured to monitor, based on signals from the sensor, presence of a user in front of the sensor, to determine, based on the signals from the sensor, that a user is not present in front of the sensor and, in response to determining that the user is not present in front of the sensor based on the sensor signals, to transmit a keystroke code to a computer, wherein the keystroke code is configured to cause the computer to implement a computer lock, wherein the controller is configured to recognize a face of the user, and wherein the controller is configured to determine that the user is present in front of the sensor based on additional signals output by the sensor and, in response to determining that the user is present in front of the sensor, the controller is configured to transmit an additional keystroke code to the computer that is a user's password for unlocking the computer.

9. The system of claim 1, wherein the sensor is a radar sensor.

10. A computer locking method comprising:

monitoring presence of a user in front of a sensor;

determining, based on signals from the sensor, that a user is not present in front of the sensor; and in response to determining that the user is not present in front of the sensor based on the sensor signals, transmitting a keystroke code to a computer, wherein the keystroke code is configured to cause the computer to implement a computer lock, wherein the keystroke code denotes a simultaneous selection of multiple keys that is defined as a screen lock code by an operating system of the computer.

11. The method of claim 10, wherein the computer lock is a screen lock.

12. The method of claim 10, wherein the sensor is integrated into a keyboard coupled to the computer and wherein the keystroke code is transmitted by a processor integrated into keyboard to the computer via an interface with which the keyboard is coupled to the computer.

13. The method of claim 10, wherein the sensor is mounted on a display device coupled to the computer.

14. The method of claim 10, wherein the monitoring comprises monitoring a distance of the user from the sensor and the determining comprises determining that the user is not present within a predefined distance of the sensor.

15. The method of claim 14, wherein the determining that the user is not present within the predefined distance of the sensor comprises determining that the user is not present within the predefined distance of the sensor for a time interval selected by the user.

16. The method of claim 10, wherein the monitoring comprises recognizing a face of the user.

17. The method of claim 16, wherein the method comprises determining that the user is present in front of the sensor based on additional signals output by the sensor and, in response to determining that the user is present in front of the sensor, transmitting an additional keystroke code to the computer that is a user's password for unlocking the computer.

18. The method of claim 10, wherein the sensor is a radar sensor.

* * * * *